United States Patent
Yang et al.

(10) Patent No.: US 9,606,657 B2
(45) Date of Patent: Mar. 28, 2017

(54) ARRAY SUBSTRATE, CAPACITIVE TOUCH PANEL AND TOUCH DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Shengji Yang, Beijing (CN); Xue Dong, Beijing (CN); Haisheng Wang, Beijing (CN); Lei Wang, Beijing (CN); Chunlei Wang, Beijing (CN); Yingming Liu, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 0 days.

(21) Appl. No.: 14/406,322

(22) PCT Filed: Apr. 22, 2014

(86) PCT No.: PCT/CN2014/075979
§ 371 (c)(1),
(2) Date: Dec. 8, 2014

(87) PCT Pub. No.: WO2015/103824
PCT Pub. Date: Jul. 16, 2015

(65) Prior Publication Data
US 2015/0309630 A1    Oct. 29, 2015

(30) Foreign Application Priority Data

Jan. 9, 2014 (CN) .......................... 2014 1 0010247

(51) Int. Cl.
*G06F 3/041* (2006.01)
*G02F 1/1333* (2006.01)
(Continued)

(52) U.S. Cl.
CPC .......... *G06F 3/0412* (2013.01); *G02F 1/1333* (2013.01); *G02F 1/1368* (2013.01);
(Continued)

(58) Field of Classification Search
CPC ...... G06F 3/0412; G06F 3/044; G06F 3/0416; G06F 2203/04111; G02F 1/13338;
(Continued)

(56) References Cited

U.S. PATENT DOCUMENTS 8,780,078 B2    7/2014 Kim et al.
9,268,453 B2 *  2/2016 Kim ................. G02F 1/136204
(Continued)

FOREIGN PATENT DOCUMENTS

CN      101738765 A     6/2010
CN      1027600017 A    10/2012
(Continued)

OTHER PUBLICATIONS

Chinese Office Action of Chinese Application No. 201410010247.1, mailed Nov. 3, 2015 with English translation.
(Continued)

*Primary Examiner* — Sanjiv D Patel
(74) *Attorney, Agent, or Firm* — Collard & Roe, P.C.

(57) ABSTRACT

An array substrate, a capacitive in-cell touch panel and a touch display device are provided. The common electrode layer (20) of the array substrate (1) includes a plurality of touch drive electrodes (6) and a plurality of common electrodes (7), the respective touch drive electrodes (6) extending in a row direction, and the respective common electrodes (7) extending in a column direction. The pixel electrode
(Continued)

layer (30) includes a plurality of first conductors (8), projections of the respective first conductors (8) on the array substrate (1) are located in a region where the common electrodes (7) are located, and at least partially overlap with the data line (5) whose projection is located in the region where the common electrodes (7) are located, and a plurality of the first conductors (8) whose projections are located in a same region where the common electrodes (7) are located constitute a touch sensing electrode. Since the touch drive electrodes (6) and the touch sensing electrode (9) are respectively disposed on the common electrode layer (20) and the pixel electrode layer (30), the array substrate with a touch function can be prepared without adding an additional fabrication process, so its preparation process is simple, which reduces the production cost and improves the production efficiency.

10 Claims, 3 Drawing Sheets

(51) Int. Cl.
G06F 3/044 (2006.01)
G02F 1/1362 (2006.01)
G02F 1/1368 (2006.01)
G09G 3/36 (2006.01)

(52) U.S. Cl.
CPC .... *G02F 1/13338* (2013.01); *G02F 1/136286* (2013.01); *G06F 3/044* (2013.01); *G09G 3/36* (2013.01); *G09G 3/3655* (2013.01); *G06F 2203/04101* (2013.01); *G06F 2203/04111* (2013.01); *G06F 2203/04112* (2013.01); *G09G 2300/023* (2013.01); *G09G 2300/0408* (2013.01); *G09G 2300/0426* (2013.01); *G09G 2300/08* (2013.01); *G09G 2300/0814* (2013.01); *G09G 2310/08* (2013.01)

(58) Field of Classification Search
CPC ............ G02F 1/1333; G02F 1/136286; G02F 1/1368; G02F 2001/134318; G09G 2300/0426
See application file for complete search history.

(56) References Cited

U.S. PATENT DOCUMENTS

| 2012/0274603 | A1* | 11/2012 | Kim | G06F 3/0412 345/174 |
| 2013/0033439 | A1* | 2/2013 | Kim | G02F 1/13338 345/173 |
| 2014/0078418 | A1 | 3/2014 | Mu | |
| 2014/0111466 | A1* | 4/2014 | Kim | G06F 3/044 345/174 |
| 2014/0146246 | A1 | 5/2014 | Ma et al. | |
| 2014/0168154 | A1 | 6/2014 | Wang et al. | |
| 2014/0184559 | A1* | 7/2014 | Han | G06F 3/0412 345/174 |
| 2014/0210774 | A1* | 7/2014 | Kim | G06F 3/044 345/174 |

FOREIGN PATENT DOCUMENTS

| CN | 102890379 A | 1/2013 |
| CN | 103049156 A | 4/2013 |
| CN | 103218097 A | 7/2013 |
| CN | 103279217 A | 9/2013 |
| CN | 103279237 A | 9/2013 |
| CN | 203705761 U | 7/2014 |
| JP | 2013-238820 A | 11/2013 |

OTHER PUBLICATIONS

International Search Report, International Preliminary Report on Patentability and Written Opinion of the International Searching Authority of PCT/CN2014/075979 in Chinese, mailed Sep. 30, 2014.
Second Chinese Office Action in Chinese Application No. 201410010247.1, mailed Jun. 20, 2016 with English translation.
English translation of the International Preliminary Report on Patentability and Written Opinion of the International Searching Authority of PCT/CN2014/075979, issued Jul. 12, 2016.
Third Chinese Office Action in Chinese Application No. 201410010247.1, mailed Dec. 5, 2016 with English translation.

* cited by examiner

ARRAY SUBSTRATE, CAPACITIVE TOUCH PANEL AND TOUCH DISPLAY DEVICE

CROSS REFERENCE TO RELATED APPLICATIONS

This application is the National Stage of PCT/CN2014/075979 filed on Apr. 22, 2014, which claims priority under 35 U.S.C. §119 of Chinese Application No. 201410010247.1 filed on Jan. 9, 2014, the disclosure of which is incorporated by reference.

TECHNICAL FIELD

Embodiments of the invention relate to an array substrate, a capacitive in-cell touch panel and a touch display device.

BACKGROUND

In terms of composition structure, touch panels can be divided into: an Add on Mode Touch Panel, an On Cell Touch Panel, and an In Cell Touch Panel. For the Add on Mode Touch Panel, the touch panel and a Liquid Crystal Display (LCD) are produced separately, and then stuck together into a liquid crystal display with a touch function. The Add on Mode Touch Panel has a higher fabrication cost, a lower light transmittance and a thicker module; and the On Cell Touch Panel also has the same problem of thicker module as the Add on Mode Touch Panel. However, the capacitive in-cell touch panel embeds a touch drive electrode of the touch panel within the liquid crystal display, which implements a touch sensing circuit within a cell, so the module thereof can be made thinner, lighter and more cost-effective than implementation modes of other touch panels.

Currently, the current capacitive in-cell touch panel is implemented by directly adding additional touch scanning lines and touch sensing lines on the existing Thin Film Transistor (TFT) array substrate, that is, two layers of strip Indium Tin Oxides (ITO) electrodes intersecting each other in different planes are fabricated on the TFT array substrate, the two layers of ITO electrodes respectively serve as the touch drive lines and the touch sensing lines of the touch panel, which form mutual capacitance at the intersection of the two strip ITO electrodes in different planes; or part of the common electrodes on the array substrate serve as the touch drive lines, and additional touch sensing lines are added on a color filter substrate.

The above preparation process, when the TFT array substrate used for the capacitive in-cell touch panel is prepared, has a high preparation cost and a low production efficiency, which also means increased preparation cost and difficulty of the capacitive in-cell touch panel.

SUMMARY OF THE INVENTION

According to an embodiment of the invention, there is provided an array substrate, comprising:

A substrate with a plurality of pixel units arranged in a matrix, a common electrode layer and a pixel electrode layer formed thereon, gate electrode signal lines and common electrode signal lines disposed in a row direction, and a data line disposed between two adjacent columns of the pixel units;

The common electrode layer includes a plurality of touch drive electrodes and a plurality of common electrodes, the respective touch drive electrodes extending in a row direction, and the respective common electrodes extending in a column direction; and within a display time of one frame of picture, the respective touch drive electrodes are used for time-sharing transmission of touch scanning signals and common electrode signals;

The pixel electrode layer includes a plurality of first conductors, projections of the respective first conductors on the array substrate are located in a region where the common electrodes are located, and at least partially overlap with the data line whose projection is located in the region where the common electrodes are located, a plurality of the first conductors whose projections are located in a same region where the common electrodes are located constitute a touch sensing electrode.

In one example, each of the touch drive electrodes includes a plurality of touch drive sub-electrodes disposed in a same row, and the respective touch drive sub-electrodes are located between the adjacent common electrodes.

In one example, the respective touch drive sub-electrodes of the touch drive electrodes are electrically connected with at least one common electrode signal line through a first via hole.

In one example, the respective common electrodes are strip electrodes, and the common electrodes and the touch drive sub-electrodes are insulated from each other.

In one example, the common electrodes are electrically connected with the common electrode signal lines that are not connected with the touch drive electrodes through a second via hole.

In one example, each of the common electrodes includes a plurality of the common sub-electrodes, and the plurality of common sub-electrodes included by each of the common electrodes correspond to a column of the touch drive sub-electrodes one by one.

In one example, the respective touch drive sub-electrodes of the touch drive electrodes are electrically connected with at least one common electrode signal line through a first via hole, and the common sub-electrodes in a same row with the touch drive electrodes are electrically connected with the common electrode signal lines that are not connected with the touch drive electrodes through a second via hole.

In one example, both the respective touch drive sub-electrodes of the touch drive electrodes and the common sub-electrodes in the row where the touch drive electrodes are located are electrically connected with at least one common electrode signal line through the first via hole.

In one example, every two adjacent rows of pixel units being a pixel unit group, two of the gate electrode signal lines are disposed between two rows of the pixel units of each of the pixel unit groups, the two gate electrode signal lines respectively provide gate electrode scanning signals for one row of the pixel units, and one of the common electrode signal lines is disposed between every two adjacent pixel unit groups.

According to another embodiment of the invention, there is provided a capacitive touch panel, comprising two substrates cell-assembled with each other and liquid crystal disposed between the two substrates, wherein one of the two substrates is the array substrate according to the above-described embodiment.

According to a further embodiment of the invention, there is provided a touch display device, comprising the capacitive touch panel according to the above-described embodiment.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DESCRIPTION OF THE EMBODIMENTS

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Figure 1:
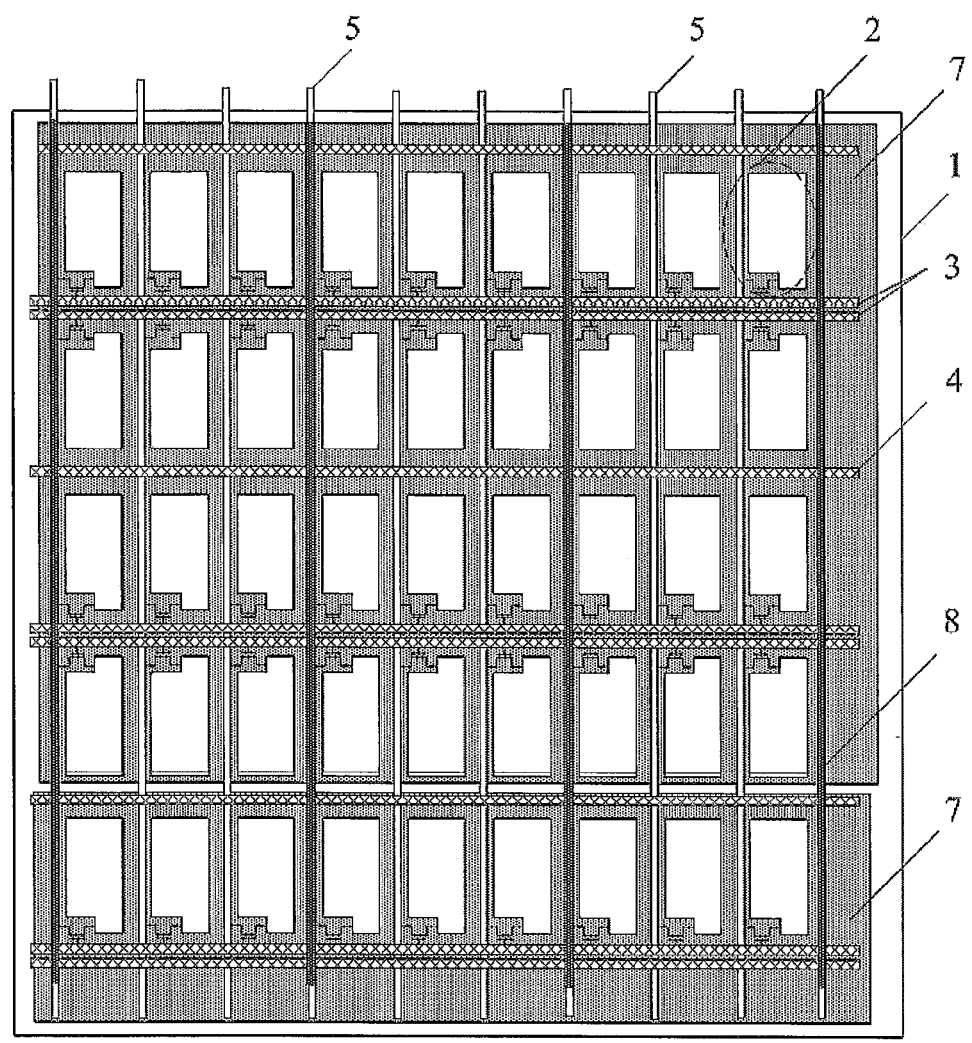
FIG. 1 is a partial top view of an array substrate provided by an embodiment of the invention.

With reference to FIG. 1, an array substrate provided by an embodiment of the invention, comprises a substrate 1 with a plurality of pixel units 2 arranged in a matrix formed thereon, gate electrode signal lines 3 and common electrode signal lines 4 disposed in a row direction, and a data line 5 disposed between two adjacent columns of the pixel units 2.

Figure 2:
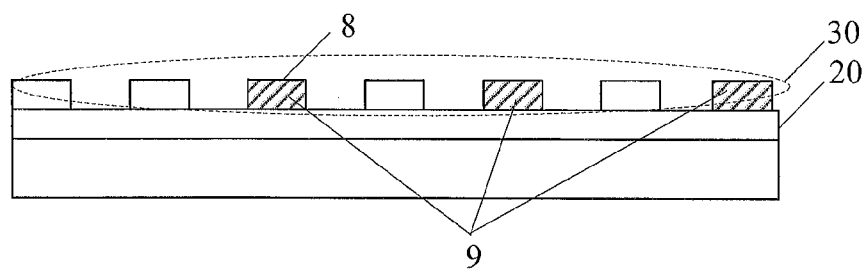
FIG. 2 is a partial cross-sectional schematic diagram of an array substrate provided by an embodiment of the invention.

With reference to FIG. 2, the array substrate further comprises a common electrode layer 20 and a pixel electrode layer 30.

Figure 3:
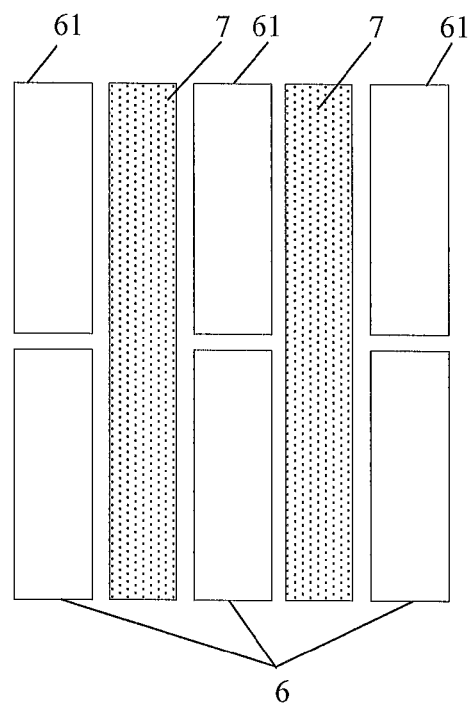
FIG. 3 is a structural schematic diagram of touch drive electrodes and touch sensing electrodes provided by an embodiment of the invention.

In conjunction with FIG. 1 and FIG. 2, with reference to FIG. 3, the common electrode layer 20 includes a plurality of touch drive electrodes 6 and a plurality of common electrodes 7, the touch drive electrodes 6 and the common electrodes 7 intersecting with each other, and the respective touch drive electrodes 6 extending in a row direction of the pixel units 2, and the respective common electrodes 7 extending in a column direction of the pixel units 2; within a display time of one frame of picture, the respective touch drive electrodes 6 are used for time-sharing transmission of touch scanning signals and common electrode signals.

The pixel electrode layer 30 includes a plurality of first conductors 8, projections of the respective first conductors 8 on the substrate 1 are located in a region where the common electrodes 7 are located, and directly face a position of the data line 5 whose projection is located in a region where the common electrodes 7 are located, and a plurality of first conductors 8 whose projections are located in a same region where the common electrodes 7 are located constitute a touch sensing electrode 9.

The gate electrode signal lines 3 and the common electrode signal lines 4 may be disposed according to design requirement, for example, a single-gate structure or a double-gate structure. The double-gate structure pointed out by this embodiment is described as follows: every two adjacent rows of pixel units 2 being a pixel unit group, two of the gate electrode signal lines 3 are disposed between two rows of the pixel units 2 of each of the pixel unit 2 groups, the two gate electrode signal lines 3 respectively provide gate electrode scanning signals for one row of the pixel units 2, and one of the common electrode signal lines 4 is disposed between every two adjacent pixel unit groups. It should be noted that the above examples are merely illustrative, and the invention is not limited thereto.

In this embodiment, since the projections of the first conductors 8 directly face the position of the data line 5, a pixel structure and a pixel aperture ratio will not be affected, and ITO for preparing the pixel electrodes are fully used, which reduces preparation process and production cost.

Preferably, each of the touch drive electrodes 6 includes a plurality of touch drive sub-electrodes 61 disposed in a same row, and the respective touch drive sub-electrodes 61 are located between the adjacent common electrodes 7. Since the touch drive electrodes 6 and the touch sensing electrodes 9 intersect with each other, in order to ensure no contact between the two, it is necessary for either one to have a part of disconnected structure in the common electrode layer 20.

It should be noted that, sizes and shapes of the touch drive electrodes 6 and the common electrodes 7 may be adjusted according to requirements of actual design or production process. Detailed illustration is provided as follows:

To facilitate understanding, touch drive lines are represented by TX, touch sensing lines are represented by RX, then the touch drive electrodes 6 are part of the touch drive lines TX, and the touch sensing electrodes 9 are part of the touch sensing lines RX, meanwhile, reference signs in FIG. 3 are referred to for the touch drive electrodes 6 and the touch sensing electrodes 9, which will not be labeled repeatedly in the embodiments described as follows.

Figure 4:
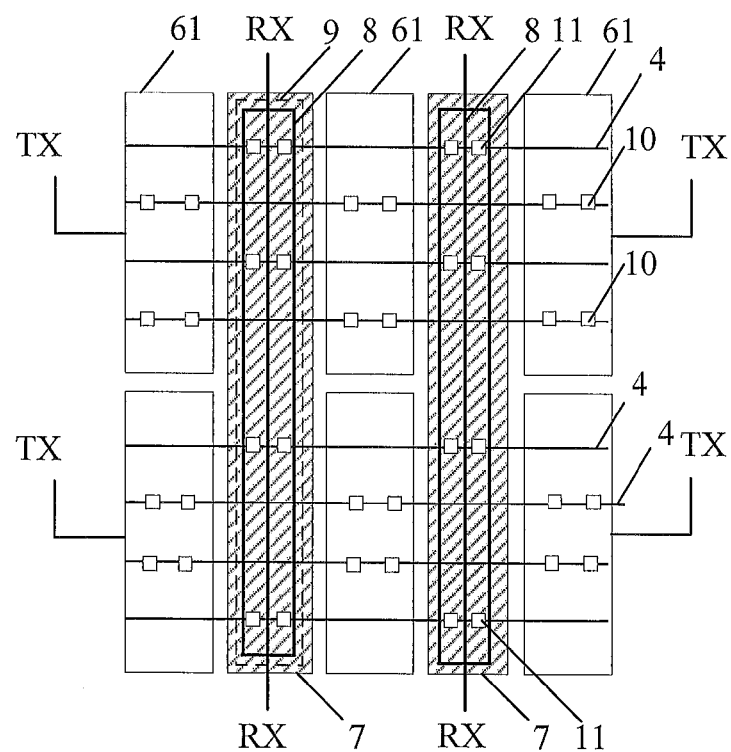
FIG. 4 is a structural schematic diagram of a first type of array substrate provided by an embodiment of the invention.

For example, with reference to FIG. 4, a structural schematic diagram of a first type of array substrate is illustrated, the respective common electrodes 7 are strip electrodes, the common electrodes 7 and the touch drive sub-electrodes 61 are insulated from each other, the respective touch drive sub-electrodes 61 of the touch drive electrodes 6 are electrically connected with at least one common electrode signal line 4 through a first via hole 10, the common electrodes 7 are electrically connected with the common electrode signal lines 4 that are not connected with the touch drive electrodes 6 through a second via hole 11. The touch drive lines TX are constituted by the touch drive electrodes 6 and the common electrode signal lines connected therewith, the touch sensing lines RX are constituted by the touch sensing electrodes 9 (i.e., at least one of the first conductors 8), and the touch sensing electrodes 9 correspond to the common electrodes 7 in position (e.g., projections thereof on the substrate overlap at least partially). In this embodiment, the strip common electrodes 7 are easy to implement, which facilitates simplification of design; meanwhile, in the structure, the touch drive sub-electrodes 61 constituting the touch drive electrodes 6 do not overlap the touch sensing electrodes 9, but only the common electrode signal lines 4 connected with the touch drive sub-electrodes 61 overlap the touch sensing electrodes 9, so that a smaller orthogonal coupling capacitance is formed between the touch drive electrodes 6 and the touch sensing electrodes 9, which facilitates electric field projection, so as to ensure implementation of touch function.

As illustrated in FIG. 4, a plurality of touch drive sub-electrodes 61 disposed in a same row are electrically connected together by the common electrode signal lines 4 to form the touch drive electrodes 6. Thus, from an overall view, the touch drive electrodes 6 extend in a row direction.

Figure 5:
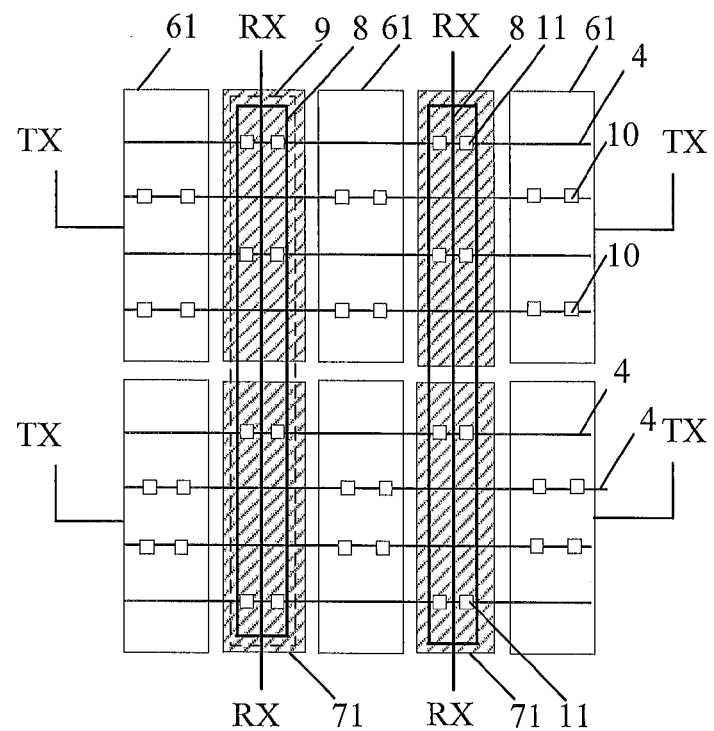
FIG. 5 is a structural schematic diagram of a second type of array substrate provided by an embodiment of the invention.

For another example, with reference to FIG. 5, a structural schematic diagram of a second type of array substrate is illustrated, each of the common electrodes 7 includes a plurality of common sub-electrodes 71, and the plurality of common sub-electrodes 71 included by each of the common electrodes 7 correspond to a column of the touch drive sub-electrodes 61 one by one; the respective touch drive sub-electrodes 61 of the touch drive electrodes 6 are electrically connected with at least one common electrode signal line 4 through the first via hole 10, the common sub-electrodes 71 in a same row with the touch drive electrodes are electrically connected with the common electrode signal lines 4 that are not connected with the touch drive electrodes 6 through the second via hole 11. The touch drive lines TX are constituted by the touch drive electrodes 6 and the common electrode signal lines connected therewith, the touch sensing lines RX are constituted by the touch sensing electrodes 9 (i.e., at least one of the first conductors 8), and the touch sensing electrodes 9 correspond to the common electrodes 7 in position. In this embodiment, the touch drive sub-electrodes 61 constituting the touch drive electrodes 6 do not overlap the touch sensing electrodes 9, but only the common electrode signal lines 4 connected with the touch drive sub-electrodes 61 overlap the touch sensing electrodes 9, so that a smaller orthogonal coupling capacitance is formed between the touch drive electrodes 6 and the touch sensing electrodes 9, which facilitate electric field projection, so as to ensure implementation of the touch function.

Figure 6:
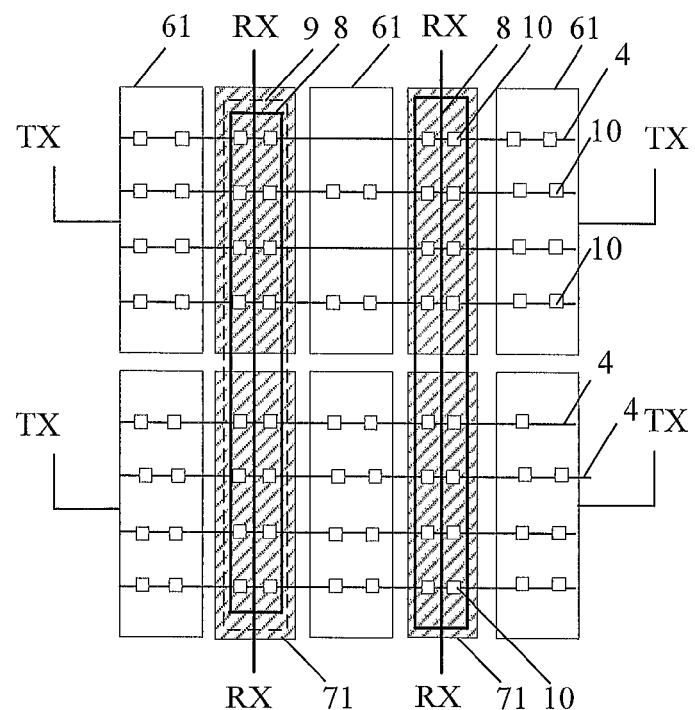
FIG. 6 is a structural schematic diagram of a third type of array substrate provided by an embodiment of the invention.

For example, with reference to FIG. 6, a structural schematic diagram of a third type of array substrate is illustrated, each of the common electrodes 7 includes a plurality of common sub-electrodes 71, and the plurality of common sub-electrodes 71 included by each of the common electrodes 7 correspond to a column of the touch drive sub-electrodes 61 one by one; both the respective touch drive sub-electrodes 61 of the touch drive electrodes 6 and the common sub-electrodes 71 in a row where the touch drive electrodes 6 are located are electrically connected with at least one common electrode signal line 4 through the first via hole 10. The touch drive lines TX are constituted by the touch drive electrodes 6 and the common electrode signal lines connected therewith, the touch sensing lines RX are constituted by the touch sensing electrodes 9 (i.e., at least one of the first conductors 8), and the touch sensing electrodes 9 correspond to the common electrodes 7 in position.

The embodiments of the invention have advantageous effects as follows: the touch drive electrodes and the touch sensing electrodes are respectively disposed on the common electrode layer and the pixel electrode layer, and therefore, based on the existing preparation process of the TFT array substrate, the array substrate with the touch function can be prepared without additionally adding a fabrication process, and the in-cell touch panel can be formed just by combining the array substrate and display component, so its preparation process is simple, which reduces the production cost and improves the production efficiency; meanwhile, the touch sensing electrodes and the touch drive electrodes are incompletely orthogonal, so as to form a smaller orthogonal coupling capacitance between the two, which facilitates electric field projection, thus ensuring implementation of the touch function.

An embodiment of the invention provides a capacitive embedded touch panel, comprising two substrates cell-assembled with each other and liquid crystal disposed between the two substrates, wherein one of the two substrates is the array substrate provided by the above-described embodiment. In this embodiment, the other box-formed substrate may be a color filter substrate.

An embodiment of the invention provides a touch display device, comprising the capacitive embedded touch panel provided by the above-described embodiment.

The embodiments of the invention have advantageous effects as follows: on the TFT array substrate used in the capacitive in-cell touch panel, the touch drive lines are constituted by common electrode units and the common electrode signal lines, the touch sensing lines are constituted by the first conductors disposed on the same layer with the pixel electrodes, and based on the existing preparation process of the TFT array substrate, the array substrate with the touch function can be prepared without additionally adding a fabrication process, and the in-cell touch panel can be formed just by combining the array substrate and display component, so its preparation process is simple, which reduces the production cost and improves the production efficiency.

The foregoing embodiments merely are exemplary embodiments of the invention, and not intended to define the scope of the invention, and the scope of the invention is determined by the appended claims.

What is claimed is:
1. An array substrate, comprising:
a substrate with a plurality of pixel units arranged in a matrix, a common electrode layer and a pixel electrode layer formed thereon, gate electrode signal lines and common electrode signal lines disposed in a row direction, and a data line disposed between two adjacent columns of the pixel units;
the common electrode layer including a plurality of touch drive electrodes and a plurality of common electrodes, the respective touch drive electrodes extending in a row direction, and the respective common electrodes extending in a column direction; and within a display time of one frame of picture, the respective touch drive electrodes being used for time-sharing transmission of touch scanning signals and common electrode signals;
the pixel electrode layer including a plurality of first conductors, projections of the respective first conductors on the array substrate being located in a region where the common electrodes are located, and at least partially overlapping with the data line whose projection is located in the region where the common electrodes are located, a plurality of the first conductors whose projections are located in a same region where the common electrodes are located constituting a touch sensing electrode,
wherein the common electrode layer and the pixel electrode layer are located at different layers such that the touch drive electrode and the touch sensing electrode are formed in different layers,
wherein, each of the touch drive electrodes includes a plurality of touch drive sub-electrodes disposed in a same row, the respective touch drive sub-electrodes are located between the adjacent common electrodes, and
the respective touch drive sub-electrodes of the touch drive electrodes are electrically connected with at least one common electrode signal line through a first via hole, the common electrodes are electrically connected with the common electrode signal lines that are not connected with the touch drive electrodes through a second via hole.

2. The array substrate according to claim 1, wherein, the respective common electrodes are strip electrodes, and the common electrodes and the touch drive sub-electrodes are insulated from each other.

3. The array substrate according to claim 1, wherein, each of the common electrodes includes a plurality of the common sub-electrodes, and the plurality of common sub-electrodes included by each of the common electrodes correspond to a column of the touch drive sub-electrodes one by one.

4. The array substrate according to claim 3, wherein, the respective touch drive sub-electrodes of the touch drive electrodes are electrically connected with at least one common electrode signal line through a first via hole, and the common sub-electrodes in a same row with the touch drive electrodes are electrically connected with the common electrode signal lines that are not connected with the touch drive electrodes through a second via hole.

5. The array substrate according to claim 3, wherein, both the respective touch drive sub-electrodes of the touch drive electrodes and the common sub-electrodes in the row where the touch drive electrodes are located are electrically connected with at least one common electrode signal line through the first via hole.

6. The array substrate according to claim 1, wherein, every two adjacent rows of pixel units being a pixel unit group, two of the gate electrode signal lines are disposed between two rows of the pixel units of each of the pixel unit groups, the two gate electrode signal lines respectively provide gate electrode scanning signals for one row of the pixel units, and one of the common electrode signal lines is disposed between every two adjacent pixel unit groups.

7. A capacitive touch panel, comprising two substrates cell-assembled with each other and liquid crystal disposed between the two substrates, wherein one of the two substrates is the array substrate according to claim 1.

8. A touch display device, comprising the capacitive touch panel according to claim 7.

9. The capacitive touch panel according to claim 7, wherein, the respective common electrodes are strip electrodes, and the common electrodes and the touch drive sub-electrodes are insulated from each other.

10. The capacitive touch panel according to claim 7, wherein, each of the common electrodes includes a plurality of the common sub-electrodes, and the plurality of common sub-electrodes included by each of the common electrodes correspond to a column of the touch drive sub-electrodes one by one.

* * * * *